United States Patent [19]

Carbrey

[11] 3,745,256

[45] July 10, 1973

[54] TIME DIVISION SWITCHING ARRANGEMENT UTILIZING A HYBRID CIRCUIT

[75] Inventor: Robert Lawrence Carbrey, Boulder, Colo.

[73] Assignee: Bell Telephone Laboratories, Incorporated, Murray Hill, N.J.

[22] Filed: Dec. 20, 1971

[21] Appl. No.: 209,537

[52] U.S. Cl..... 179/15 AT, 179/15 AQ, 179/15 AA, 179/170 NC

[51] Int. Cl. .............................................. H04j 3/02

[58] Field of Search .................... 179/15 A, 15 AA, 179/15 AQ, 170 NC, 16 EC; 333/11

[56] References Cited

UNITED STATES PATENTS

| | | | |
|---|---|---|---|
| 3,251,947 | 5/1966 | Schlichte | 179/15 AA |
| 3,267,218 | 8/1966 | Adelaar | 179/15 AA |

FOREIGN PATENTS OR APPLICATIONS

| | | | |
|---|---|---|---|
| 1,128,198 | 9/1968 | Great Britain | 179/170 NC |

*Primary Examiner*—Ralph D. Blakeslee
*Attorney*—W. L. Keefauver

[57] ABSTRACT

A time division communication system hybrid circuit transfers signals between a two-wire line and the incoming and outgoing paths of a four-wire line in two successive time intervals of a selected time slot. A signal from the incoming path is stored in a first store during the first time interval and the stored signal is coupled to the two-wire line. A second store is connected to the two-wire line to store the signal appearing on said two-wire line, including the coupled incoming signal and the outgoing signal from the two-wire line. During the second time interval, a portion of the first store signal is subtracted from the second store signal and the resultant difference signal is applied to the outgoing path.

19 Claims, 8 Drawing Figures

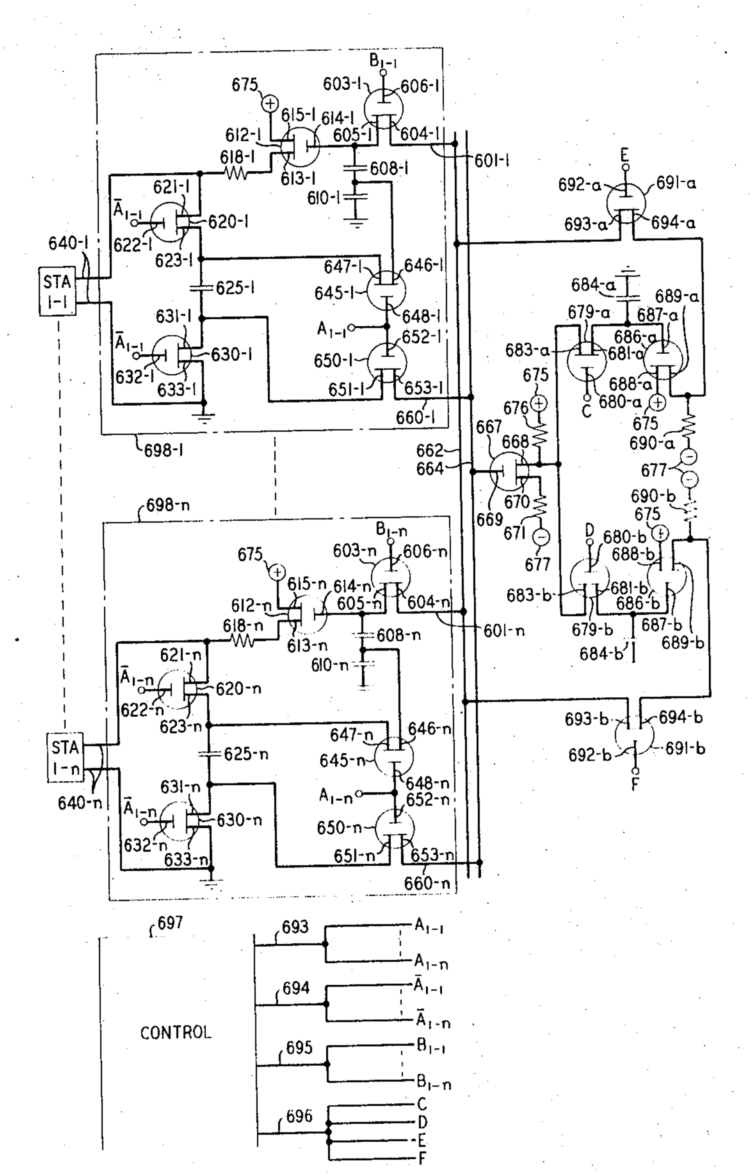
STA 1-1
STA 1-n
CONTROL
A1-1
A1-n
B1-1
B1-n
C
D
E
F

TIME DIVISION SWITCHING ARRANGEMENT UTILIZING A HYBRID CIRCUIT

BACKGROUND OF THE INVENTION

My invention is related to communication systems, more particularly to signal exchange arrangements in time division switching systems, and more particularly to signal exchange arrangements in time division communication systems utilizing four-wire lines.

Time division switching systems permit simultaneous exhange of information between selectively connected lines over a common communication link. Each information exchange between a pair of lines occurs in a selected recurring time slot of a repetitive group of time slots. During each repetitive time slot group, pairs of active lines are connected in sequence to the common link in preassigned time slots. In a time slot assigned to a connection, a channel is provided between a pair of selected lines, the information from each line in the connection is sampled and the sampled information is exchanged between the selected lines over the common link. The common link is available to other connections during the remaining time slots of the repetitive cycle. As is well known in the art, the signal sampling rate for the lines may be chosen to provide an accurate transfer of signals between the selectively connected lines.

In time division systems, it is often required to exchange signals between the incoming and outgoing paths of a four-wire line and the bidirectional path of a two-wire line. Prior art time division hybrid arrangements have generally required at least three successive time intervals for a complete transfer between a two-wire line and a four-wire line. At least one of the time intervals is needed to completely discharge a storage capacitor in the hybrid arrangement at the end of the transfer. The interval used for discharge prior to another hybrid transfer reduces the available time during the repetitive time slot cycle whereby the capacity of the time division system is limited. Further, priorly known time division hybrid arrangements generally utilize common path equipment to separate incoming and outgoing signals. The common path equipment and the additional switching arrangements required therefor adds to the cost of the system and may limit the range of applications of the hybrid arrangement. It is therefore advantageous to provide a hybrid circuit arrangement in a time division communication system wherein the interval for discharge of storage capacitors is eliminated from the hybrid transfer and in which separation of incoming and outgoing signals in the four-wire line is accomplished economically within the hybrid arrangement without the need for unduly complex switching and control equipment.

SUMMARY OF THE INVENTION

My invention is a hybrid arrangement for transferring signals between a bidirectional path and a pair of incoming and outgoing paths in a time division communication system having a plurality of time slots occurring in repetitive cycles. The hybrid circuit includes a first store for storing signals received from an incoming path during one interval of a distinct time slot and a device for coupling the stored incoming path signals to the bidirectional path. A second store in the hybrid is coupled to the bidirectional path and operates to store both the coupled incoming path signals and the outgoing signals from the bidirectional path. During another time interval of the distinct time slot, a portion of the stored incoming path signals from the signal of the second store and the resultant difference signal which corresponds to the bidirectional path outgoing signal is coupled to the outgoing path.

According to one aspect of the invention, signals are exchanged between a selected pair of a plurality of stations in a distinct time slot via first and second common buses. Each station in the time division system has associated therewith a coupling circuit corresponding to the aforementioned hybrid. The incoming path of each hybrid is selectively connectible to the first common bus; the outgoing path of each hybrid is selectively connectible to the second common bus; and a signal transfer network is operative to transfer signals from the second common bus to the first common bus in each time slot. During a first time interval of the distinct time slot, the outgoing path signals from a first selected station hybrid derived from the first and second stores thereof is coupled to the incoming path of the second station hybrid via the common buses and the common bus signal transfer network. During a second time interval of the distinct time slot, the outgoing path signal from the second selected station hybrid is coupled to the incoming path of the selected first station hybrid via the common bus network arrangements. In this way, signals are exchanged between the first and second selected stations on a time division basis in two successive time intervals.

According to another aspect of my invention, signals are transferred from a first selected station to a second selected station in a distinct time slot via first and second common buses. Each station of the time division system has associated therewith the aforementioned hybrid arrangement. The outgoing path of each station hybrid is selectively connectible to the second common bus, and the incoming path of each station hybrid is selectively connectible to the first common bus. During a first time interval of a distinct time slot, the outgoing path signal from the first selected station derived from the first and second stores of the first station hybrid is applied to an intermediate store coupled to the second common bus. During a second time interval of the distinct time slot, the intermediate store is selectively coupled to the incoming path of the second station hybrid via the first common bus whereby a signal corresponding to the first station outgoing signal is applied to the first store of the second station hybrid.

According to another aspect of the invention, a signal transfer from the second selected station to the first selected station of the immediately preceding aspect of the invention may be accomplished through the use of a second intermediate storage capcitor selectively coupled between first and second common buses in a third and a fourth time interval of the distinct time slot. In the third time interval, the outgoing signal from the second station hybrid is coupled to the second intermediate storage capacitor via the second common bus; and during the fourth time interval, the second station outgoing signal stored in the intermediate storage capcitor is applied to the incoming path of the first station hybrid via the first common bus. Alternatively, the outgoing path signals from the first and second station hybrids may be successively stored in separate intermediate storage capacitors in respective first and second time intervals; and the stored signals may then be coupled therefrom to respective first stores of the first and second station hybrids in the third and fourth time intervals.

DETAILED DESCRIPTION

Figure 1:
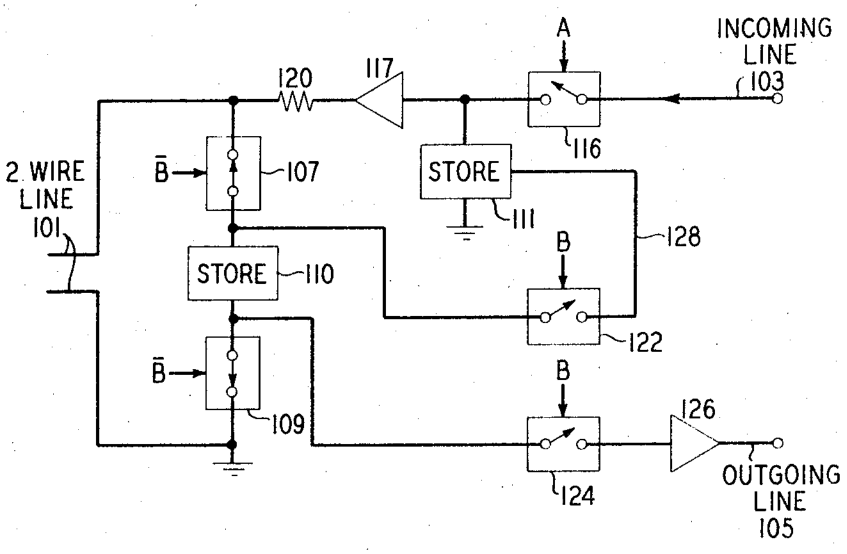
FIG. 1 depicts a general block diagram of a time division hybrid arrangement illustrative of the invention.

FIG. 1 shows a general block diagram of an embodiment illustrative of my invention. In FIG. 1, incoming line 103 is selectively connectible to store 111 via switch 116. Amplifier 117 couples the signal in store 111 to two-wire line 101 via line matching impedance 120. Where amplifier 117 has unity gain and the impedance of the two-wire line is matched, only one-half the stored signal in store 111 appears on bidirectional line 101. Store 110 is connected across two-wire line 101 via normally closed switches 107 and 109 whereby the signal originating on two-wire line 101 and the signal from the output lead of impedance 120 are inserted into store 110. A portion of the signal stored in store 111 is applied to normally open switch 122 via lead 128. The other terminal of switch 122 is connected to one terminal of store 110. Normally open switch 124 is connected between the other terminal of store 110 and amplifier 126.

During one time interval of time slot $TS_n$ (FIG. 3) assigned to the hybrid transfer, control signal A is applied to close switch 116. Control signal A is positive between $t_1$ and $t_2$ of time slot $TS_n$ as shown in waveform 301 of FIG. 3. Between times $t_1$ and $t_2$, the signal on incoming path 103 is inserted into store 111 and is also applied to the input of amplifier 117. Assume the incoming path signal is ei and 117 is a unity gain amplifier, the signal at the output of amplifier 117 becomes ei in the time interval between $t_1$ and $t_2$. Where impedance 120 combined with the output impedance of amplifier 117 matches the impedance of two-wire line 101, the signal voltage ei/2 appears across two-wire line 101 in response to the incoming path signal. A signal voltage eo from two-wire line 101 is applied together with the incoming path signal ei/2 to store 110. In this way, the incoming path signal is transferred to the two-wire line and both the incoming path signal ei/2 and the outgoing signal eo from two-wire line 101 are stored in store 110 between $t_1$ and $t_2$.

At time $t_2$, control signal A becomes negative whereby switch 116 is opened. Control signal $\overline{B}$ goes negative at time $t_2$ as indicated in waveform 305 so that both normally closed switches 107 and 109 are opened. As indicated in waveform 303, control signal B becomes positive at $t_2$ causing switches 122 and 124 to close. The switches 107 and 109 are arranged to open prior to the closing of switches 122 and 124. The output of store 111 on lead 128 at this time is ei/2 while the voltage across store 110 is ei/2+eo. The closing of switches 122 and 124 provides a series path from lead 128 to the input of amplifier 126, including series opposing stores 110 and 111 so that the resultant signal voltage at the input of amplifier 126 is outgoing signal eo. The series connection from lead 128 through the input of amplifier 125 results in the cancellation of the signal voltage ei/2 whereby only the outgoing voltage from the two-wire line eo is applied to outgoing line 105. At time $t_3$ control signal B goes negative and control signal $\overline{B}$ goes positive. The change in control signal B and $\overline{B}$ cause switches 122 and 124 to open and switches 107 and 109 to close. In accordance with the invention, the incoming path signal is transferred to the two-wire line and the outgoing signal from the two-wire line is transferred to the outgoing line in two successive time intervals of a time slot without the need for a store discharge interval.

Figure 3:
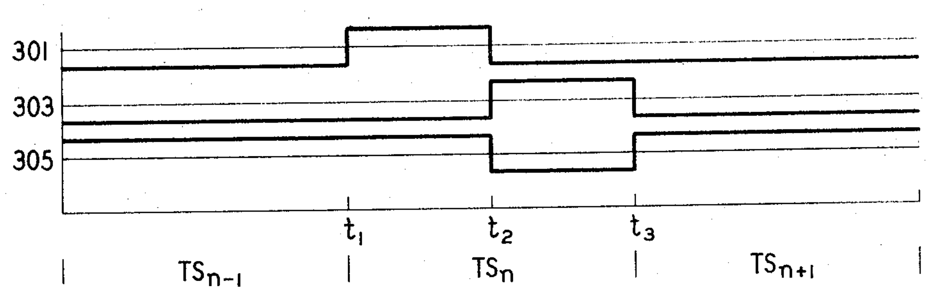
FIG. 3 shows waveforms useful in illustrating the operation of the circuits of FIGS. 1 and 2.

It should be observed that the sequence of time intervals shown in FIG. 3 may be reversed so that control signals B and $\overline{B}$ are activated between times $t_1$ and $t_2$ and control signal A is activated between times $t_2$ and $t_3$. The reverse interval sequence does not affect the hybrid transfer operation. Where, however, the time required to insert the incoming path signal into store 110 is longer than one time interval, the reverse sequence is advantageous since the time interval for signal transfer to store 110 is not limited to one time slot interval.

Figure 2:
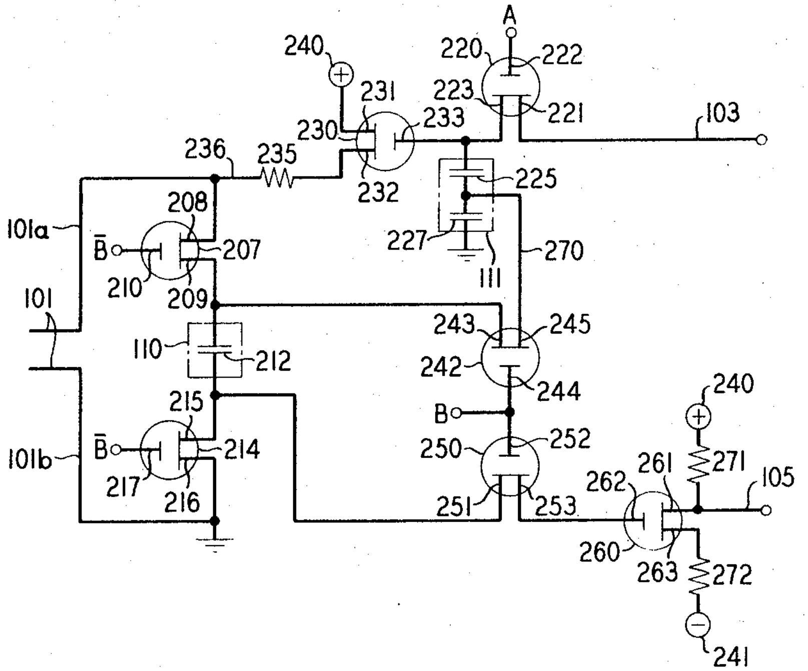
FIG. 2 depicts a detailed schematic diagram of the hybrid arrangement shown in FIG. 1 utilizing bidirectional semiconductor switches such as insulated gate field effect transistors.

FIG. 2 shows a schematic diagram of the hybrid transfer arrangement of FIG. 1 wherein store 110 comprises storage capacitor 212 and store 111 comprises series connected storage capacitors 225 and 227. The switches in FIG. 2 are all of the insulated gate field effect transistor (IGFET) type. As is well known in the art IGFETs may be used as bidirectional switches for signal voltages. This is so because the source-drain path is a low impedance regardless of signal polarity, if appropriate amplitude gate signals are applied. Consider, for example, the operation IGFET 220 of FIG. 2. Incoming path 103 is connected to source electrode 221; store 111 is connected to drain electrode 223; and gate electrode 222 is connected to the control signal A source. It is assumed in FIG. 2 that all of the IGFETs are of the *n* enhancement type. It should be understood, however, that other types of IGFETs may be used. When a positive voltage control signal is applied to gate 222, the source-drain path between electrodes 221 and 223 is a low impedance whereby signals from line 103 may pass therethrough to store 111. When control signal A is negative, the source drain path is a high impedance whereby the signal on line 103 is substantially isolated from drain electrode 223. When IGFET 220 is conducting, control signal A must be more positive than the largest expected signal and bias voltage applied to source electrode 221 or to drain electrode 223. When control signal A is negative, the negative voltage level must exceed the largest expected negative signal and bias voltage on source 221 or drain 223 in order to maintain a nonconductive source-drain path. The same principles apply to IGFET switches 207, 214, 242 and 250.

During the first time interval, between times $t_1$ and $t_2$ of FIG. 3, control signal A on waveform 301 is made positive whereby IGFET switch 220 is rendered conductive. The incoming path signal voltage ei is then applied to one terminal of capacitor 225 and to gate electrode 233 of IGFET amplifier 230. Capacitors 225 and 227 are chosen so that a portion of signal voltage ei/k is stored on capacitor 227 and the remaining portion of signal voltage ei is stored on capacitor 225. IGFET 230 is connected as a source follower which as well known in the art provides a gain of somewhat less than unity. Drain electrode 231 is connected to positive voltage source 240 and source electrode 232 is connected to ground potential through the d.c. path including impedance 235, conductor 101a, line 101 termination, and conductor 101b. In this way, IGFET 230 is biased to provide linear current amplification. Thus, the signal voltage ei applied to gate 233 results in an output signal voltage somewhat less than ei at source electrode 232.

In accordance with the principles of IGFET operation, the impedance presented at gate 233 is very high whereby the voltage stored in capacitors 225 and 227 is not dischared through IGFET 230. The output impedance of source follower 230 at drain electrode 232 is generally low so that it may drive a load such as presented by impedance 235 and the devices connected thereto. Impedance 235 is selected to match the impedance presented by bidirectional line 101. The voltage on lead 236 is arranged to be ei/k. This voltage is applied to line 101 to complete the signal voltage transfer from incoming line 103 to bidirectional line 101.

The signal voltage ei/k is further applied via normally conducting IGFET switches 207 and 214 to capacitor 212 so that, at the end of the first time interval ($t_2$), signal voltage ei/k is stored in capacitor 212. IGFET switches 207 and 214 are conductive in the time interval between times $t_1$ and $t_2$ because control signal $\overline{B}$ shown in waveform 305 is positive. Since IGFET switches 207 and 214 are conductive, the outgoing signal from bidirectional line 101 is also applied to capacitor 212 and is stored therein. Thus, at time $t_2$, the voltage across capacitor 212 is eo + ei/k. At $t_2$, control signals A and $\overline{B}$ become negative whereby IGFET switch 220 is rendered nonconductive and IGFETs 207 and 214 are also rendered nonconductive. IGFETs 242 and 250 are rendered conductive just after IFGETs 207 and 214 are opened by control signal B during the time interval between times $t_2$ and $t_3$. The signal voltage on lead 270 connected to capacitor 227 is ei/k between times $t_2$ and $t_3$ and during this time interval capacitors 227 and 212 are connected in series. The voltage across both capacitors is applied to gate 262 IGFET amplifier 260, and the total signal voltage at gate 262 is eo since capcitors 227 and 212 are connected series opposing. This is so because the signal ei/k on capacitor 227 cancels the signal ei/k on capacitor 212. Thus, only the outgoing voltage from bidirectional line 101 appears at gate 262.

The factor k may be adjusted to provide total cancellation by either adjusting the values of capacitors 225 and 227 or by adjusting the value of impedance 235. Amplifier 260 is biased in its linear range of operation by positive voltage source 240 connected to drain 261 via impedance 271 and negative voltage source 241 connected to source 263 via impedance 272. Consequently signal voltage eo appears on outgoing line 105. There is no discharge of either capacitor 227 or capacitor 212 since the input impedance seen at gate 262 is very high. The resulting signal voltage at drain 261 is applied to line 105. There is no transfer of charge between storage capacitors because of the high input impedance of the IGFET coupling amplifier connected thereto. Rather, the IGFET coupling amplifier provides a high degree of isolation between storage capacitors. Thus, when a new signal is applied to a storage capacitor from a preceding storage capacitor, the new signal voltage replaces the previously stored signal. Consequently, the transfer of signal voltage does not require a charge transfer between storage capacitors.

Figure 8:
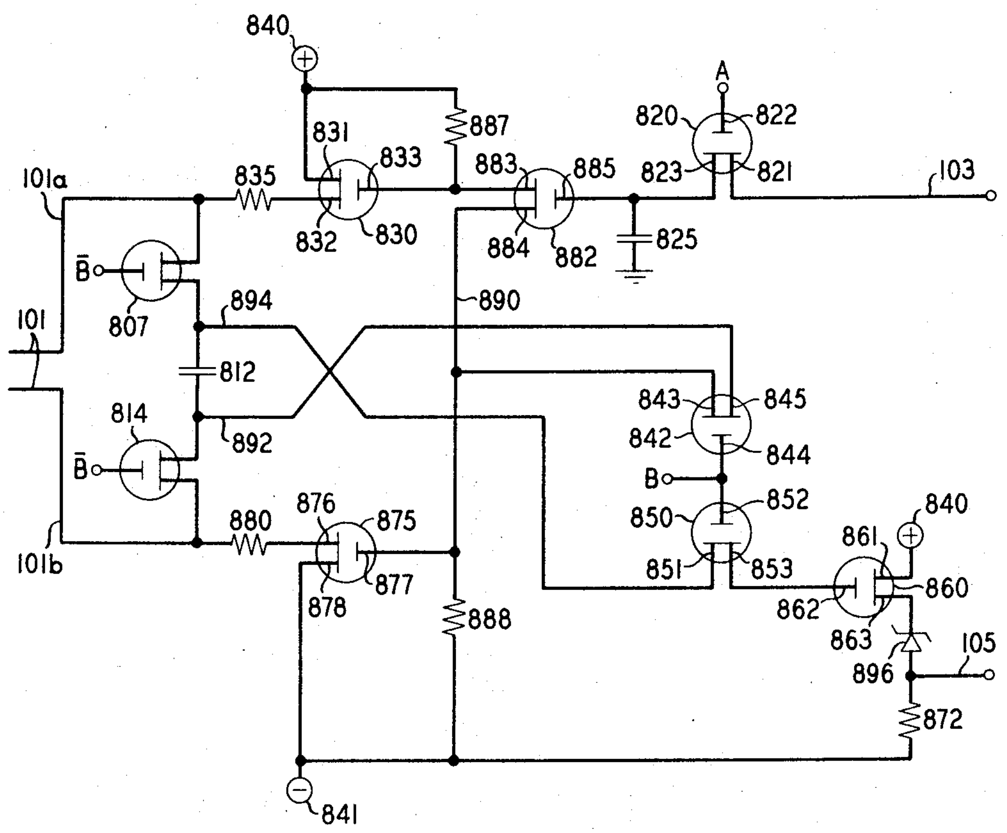
FIG. 8 depicts a balanced time division hybrid arrangement illustrative of my invention.

FIG. 8 shows a time division hybrid circuit utilizing capacitor storage and insulated gate field effect transistor switches with balanced coupling to the bidirectional line. As is well known in the art, balanced coupling substantially reduces common mode or longitudinal noise appearing on a line. During one time interval of a distinct time slot as illustrated in FIG. 3, control signal A (waveform 301) is positive so that IGFET switch 820 conducts and a signal on incoming path 103, e.g. ein, is is applied to storage capacitor 825 and to gate electrode 885 of IGFET amplifier 882. IGFET amplifier 882 is a phase splitter type amplifier well known in the art and is biased in its linear mode of operation via positive source 840, connected to drain electrode 883 via impedance 887 and negative voltage source 841 connected to source 884 through impedance 888. Ideally, amplifier 882 operates to provide the signal voltage ein on source electrode 884 and signal voltage -ein on drain electrode 883. The signal voltage -ein is applied from drain electrod 883 to gate electrode 833 of IGFET source follower 830 to that, ideally, the signal voltage −½ ein appears at the junction between matching impedance 835 and the conductor *101a* of line 101. The signal voltage −½ ein is further coupled from impedance 835 via IGFET switch 807 to storage capacitor 812. The voltage ein at source electrode 884 is applied to gate 877 of P-type IGFET 875 and is coupled therefrom to source electrode 876 so that the signal voltage ½ ein appears at the junction between matching impedance 880 and conductor *101b* of line 101. In this way, the voltage -ein appears across line 101 and also across storage capacitor 812. The d.c. biasing arangement for IGFETs 830 and 875 includes positive source 840, impedance 824, line 101, impedance 880 and negative source 841. Since line 101 is connected to storage capacitor 812 via normally closed switches 807 and 814 during the time interval between $t_1$ and $t_2$, capacitor 812 also receives a signal voltage corresponding to the outgoing voltage from line 101. Thus, the total voltage stored on capacitor 812 is eo-ein. The balanced arrangement prevents longitudinal signal components i.e. the same signal on conductor 101a and on conductor 101b from being applied to storage capacitor 812. Thus, where a signal voltage el is applied to both conductors *101a* and *101b*, the net signal voltage across storage capacitor 812 due to el is zero.

In the second time interval beginning at $t_2$, control signal A is removed thereby disconnecting incoming path 103 from storage capacitor 825. Control signal B is applied to normally closed switches 807 and 814 and control signal B is applied to normally open switches 842 and 850. Thus, storage capacitor 812 is decoupled from line 101 and the output at source electrode 884 derived from capacitor 825 is applied to one terminal of storage capacitor 812 via lead 890, closed IGFET switch 842 and lead 892. The other terminal of storage capacitor 812 is connected to source follower amplifier 860 via lead 894 and closed IGFET switch 850. Thus, the voltage at gate 862 of source follower 860 is ein + eo − ein and this voltage corresponds to the outgoing voltage from line 101.

Source follower 860 is biased in its linear mode of operation by positive source 840 connected to drain electrode 861 and negative source 841 connected to source electrode 863 via zener diode 896 and impedance 872. As is well known in the art, zener diode 896 provides a constant d.c. voltage drop when a predetermined current threshold is exceeded. Thus, the signal voltage eo appears on outgoing path 105 offset by the constant d.c. voltage drop across zener diode 896. The purpose of the zener diode 896 is to compensate for the d.c. offset voltages of the source followers in the signal transfer path. In this case, the d.c. gate-source voltage drop in IGFET 882 and the d.c. gate-source voltage drop in IGFET 875. Thus in accordance with the principles of my invention, the time division hybrid circuit of FIG. 8 couples an incoming path signal from path 103 to bidirectional path 101. It also couples the outgoing signal from bidirectional path 101 to outgoing path 105. The balanced circuit arrangement provided by phase separator 882 and source followers 830 and 875 advantageously provides immunity against longitudinal signal components on line 101, and the switching arrangement for serially connecting capacitors 825 and 812 during one time interval prevents the incoming path signal from appearing on outgoing path 105.

Figure 5:
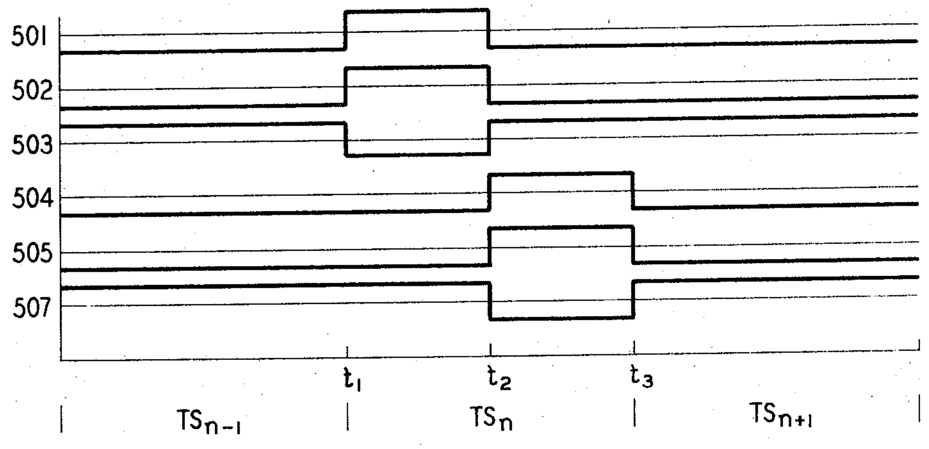
FIG. 5 shows waveforms useful in illustrating the operation of the time division signal transfer arrangement depicted in FIG. 4.
Figure 4:
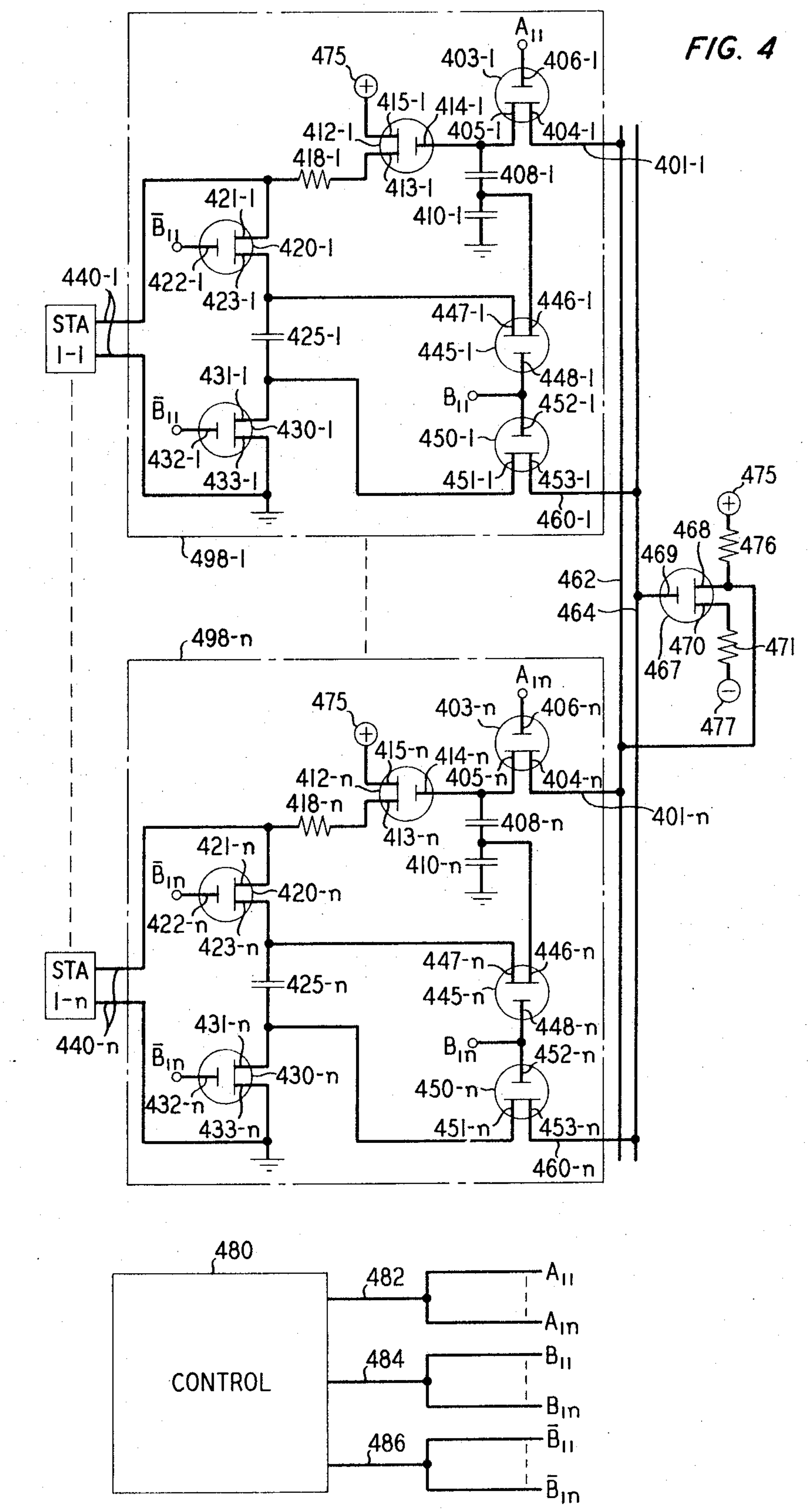
FIG. 4 depicts a time division signal transfer arrangement utilizing the hybrid arrangement of FIG. 2.

FIG. 4 shows a time division communication system wherein there are stations 1-l through 1-n, a pair of common buses 462 and 464, a signal transfer network between the bus pair, and wherein each station has an associated coupling circuit substantially similar to that shown in FIG. 2. In FIG. 4, coupling circuit 498-l is connected to station 1-l and coupling circuit 498n is connected to station 1-n. It is assumed for purposes of illustration that station 1-l is selectively connected to station 1-n via their respective coupling circuits and buses 462 and 464 during time slot $TS_n$ shown on FIG. 5. Between times $t_1$ and $t_2$ on FIG. 5 control signal $A_{ln}$ is applied to gate 406-n of coupling circuit 490-n, control signal $B_{11}$ is applied to gates 448-1 and 452-1 of IGFET switches 445-1 and 450-1, and control signal $\overline{B}_{11}$ is applied to gates 422-1 and 432-1 of IGFET switches 420-1 and 430-1. These control signals are obtained from control 480 via cables 482, 484 and 486. Control signal $A_{in}$ is illustrated in waveform 501. Control signals $B_{11}$ and $\overline{B}_{11}$ are illustrated in waveforms 502 and 503 respectively.

As a result of control signals $B_{11}$ and $\overline{B}_{11}$, IGFET switches 445-l and 450-l are rendered conductive between times $t_1$ and $t_2$ and IGFET switches 420-l and 430-l are rendered nonconductive during this time interval. Thus, the signal voltage on capacitor 410-l is applied to source electrode 446-l and through the source-drain path of IGFET 445-l to the upper end of capacitor 425-l. The lower lead of capacitor 425-l is connected to outgoing path 460-l via the source-drain path of conducting IGFET switch 450-l. In this way, the signal voltage on capacitor 410-l. derived from incoming path 401 during the previous repetitive cycle is subtracted from the signal voltage on capacitor 425-l and the resultant is applied to common bus 464. As described with respect to FIG. 2, the signal voltage on capacitor 425-l corresponds to the outgoing signal from bidirectional path 440-l and a portion of the incoming path signal derived from capacitors 408-l and 410-l and the subtraction prevents the incoming path signal from being applied to the outgoing path.

The signal now on common bus 464 is the outgoing signal eol from station 1-l and signal eol is applied to gate electrode 469 of amplifier 467 wherein it is coupled to drain 468 and therefrom to incoming path 401-n via common bus 462. Positive voltage source 475, impedances 476 and 471, and negative voltage source 477 provide the necessary bias to maintain amplifier 467 in its linear range of operation. The gain of the amplifier may be selected to be 2 whereby the signal 2eol appears on incoming path 401-n between time $t_1$ and $t_2$. In this way, a lossless signal transfer may be achieved. Since IGFET switch 403-n is rendered conductive by positive signal $A_{ln}$, the signal 2eol is coupled through the source-drain path of IGFET 403-n to gate 414-n of source follower 412-n and to capacitors 408-n and 410-n. The signal 2eol is stored on series connected capacitors 408-n and 410-n and is coupled from gate 414-n to source 413-n of IGFET 412-n. Linear biasing of IGFET 412-n is provided by positive source 475 and by impedance 418-n, station 1-n and the ground connection. Thus, the 2eol from amplifier 457 appears at source 413-n in the time interval between $t_1$ and $t_2$. Impedance 418-n is selected to match the characteristic impedance of line 440-n so that signal voltage corresponding to eol is applied to bidirectional path 440-n. This signal voltage is also applied to capacitor 425-n via normally conducting IGFET switches 420-n and 430-n. Thus, at $t_2$, signal corresponding to the outgoing voltage from station 1-l is applied to station 1-n and is also stored in capacitor 425-n.

At time $t_2$, control signals $A_{ln}$ and $B_{ll}$ become negative and control signal $\overline{B}_{11}$ becomes positive and control signal $A_{ll}$, $B_{ln}$, and $\overline{B}_{ln}$, are activated by control 480, as shown in waveforms 504, 505 and 507 respectively. Control signal $A_{ll}$ renders IGFET switch 403-l conductive; and control signal $\overline{B}_{ln}$ renders IGFET 420-n and 430-n non-conductive; and control signal $B_{ln}$ renders IGFET switches 445-n and 450-n conductive. Thus, shortly after tine $t_2$, capacitor 410-n is connected series opposing to capacitor 425-n via conductive IGFET switch 445-n and the signal voltage on capacitor 425-n less the signal voltage on capacitor 410-n is applied to outgoing path 460-n via IGFET switch 450-n. This signal corresponds to the outgoing signal eon from station 1-n. The signal eon is then applied via common bus 464 to gate 469 of amplifier 467 and is coupled from the drain electrode thereof via common bus 462 to incoming path 401-l of coupling circuit 490-l.

Since the source-drain path of IGFET switch 403-l is conductive between times $t_2$ and $t_3$, the signal 2eon is applied to gate electrode 414-l of source follower 412-l and to series connected capacitors 408-l and 410-l, source follower 412-l, and to series connected capacitors 408-l and 410-l. Source follower 412-l is biased to its linear range of operation by positive source 475, impedance 418-l and the d.c. station path. The signal corresponding to 2eon appears on source 513-l wherefrom it is applied to matching impedance 418-l. Since line 440-l is matched by impedance 418-l, the signal corresponding to eon is applied to line 440-l and is coupled via normally conducting IGFET switches 420-l and 430-l to capacitor 425-l. Thus, at $t_3$, the signal exchange between station 1-l and station 1-n is completed.

During each repetitive time slot group, the connection is made between station 1-l and station 1-n in time slot $TS_n$ and the sample of each station outgoing signal is stored in capcitor 425 of the connected station wherefrom it is made available to the connected station from the time period between succeeding $TS_n$ time slots. The transfer of signal voltage samples does not include the discharge of storage capacitors since the storage capcitors are always coupled via an amplifier. Thus, each successive signal transfer results in a replacement of the signal voltage previously stored in a storage capacitor. In this way, the signal samples transferred are held for one repetitive cycle whereby a greater portion of the signal transferred to the storage capacitors is in the frequency band desired on the receiving bidirectional line.

Figure 6:
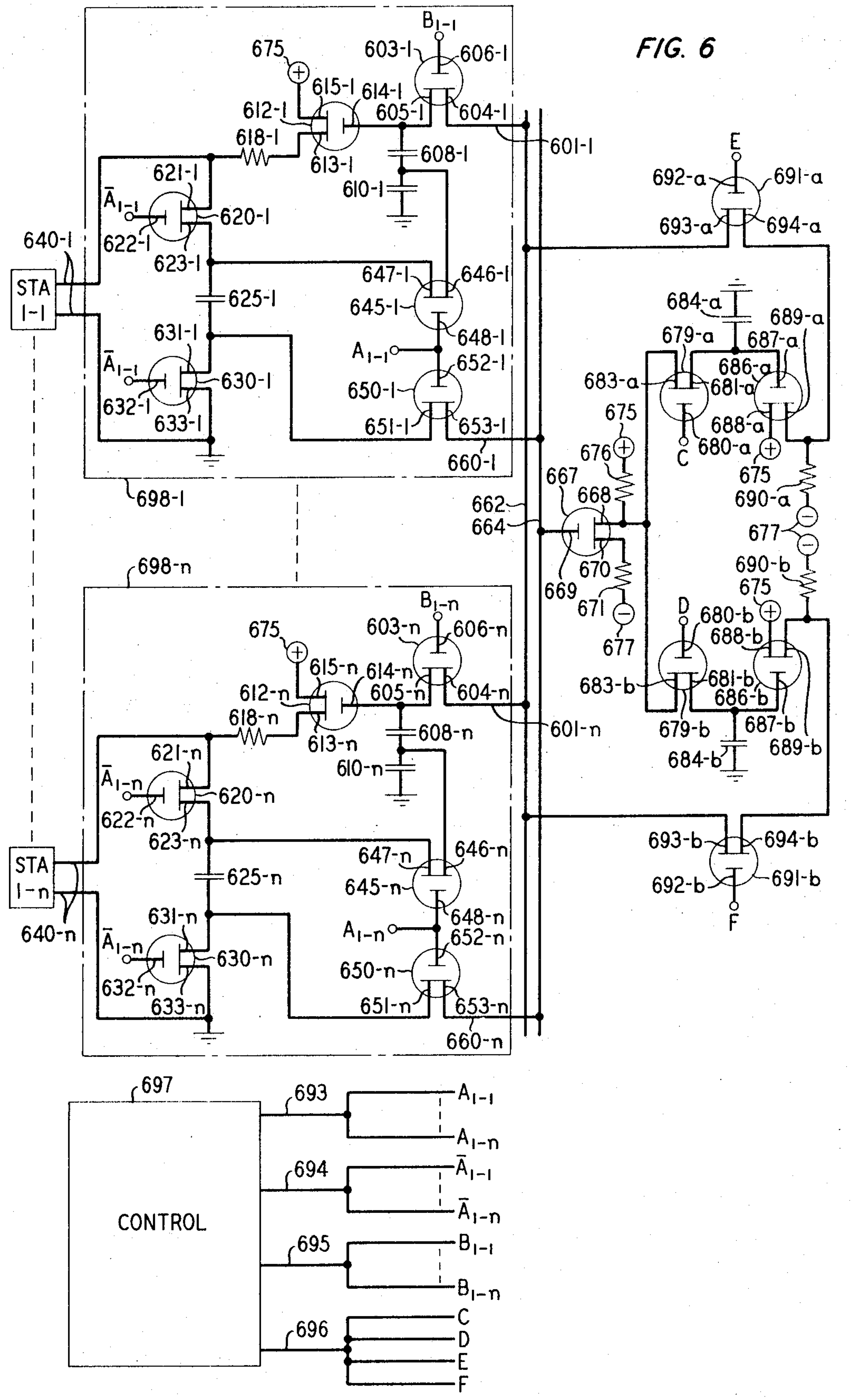
FIG. 6 depicts another time division communication signal transfer arrangement utilizing the hybrid of FIG. 2.

FIG. 6 shows another time division communication system including stations 1-l through 1-n, coupling circuits 698-l through 698-n, common buses 662 and 664 and a signal transfer network connected between buses 662 and 664 including intermediate storage capacitors 684-a and 694-b. The coupling circuit associated with each station in FIG. 6 is substantially the same as the hybrid circuit of FIG. 2. In FIG. 6, each time slot is divided into 4 successive time intervals. During the first time interval the outgoing signal from one coupling circuit, e.g., 698-l, is stored in a first intermediate storage capacitor 684-a in the signal transfer network. During the second time interval the outgoing signal from a second coupling circuit, e.g., 698-n, is stored in a second storage capacitor 684-b of the signal transfer network. In the third time interval the signal stored in the first intermediate storage capacitor 684-a is transferred to the second station coupling circuit 698-n; and during the fourth time interval, the signal voltage is stored in the second intermediate storage capacitor 684-b is transferred to the first station coupling circuit 698-l.

Figure 7:
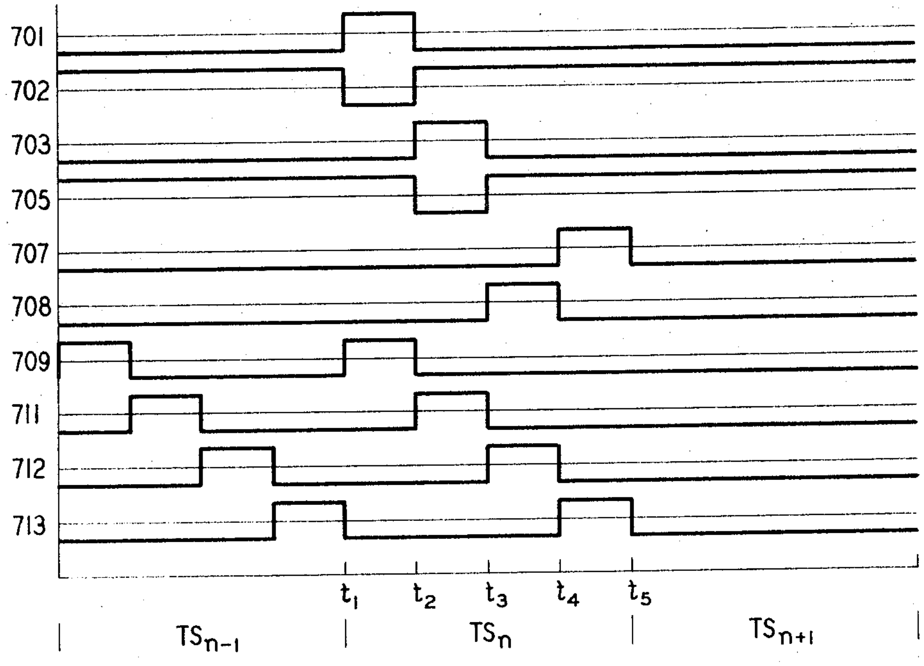
FIG. 7 shows waveforms useful in illustrating the operation of the time division signal transfer arrangement depicted in FIG. 6.

As illustrated in FIG. 7 control signals $A_{1-1}$ and $\bar{A}_{1-1}$ are activated during the first time interval between times $t_1$ and $t_2$ together with control signal C. These control signals are shown in waveforms 701, 702 and 709, respectively. Control signal $A_{1-1}$ is applied to gates 648-l and 652-l of IGFET switches 645-l and 650-l, respectively, whereby these IGFET switches are rendered conductive. Control signal $\bar{A}_{1-1}$ is applied to normally conducting IGFET switches 620-1 and 630-1 so that these IGFET switches become nonconductive between times $t_1$ and $t_2$. In this way storage capacitors 610-l and 625-l are connected series opposing between times $t_1$ and $t_2$ and the resultant output signal voltage from these capacitors is applied to outgoing line 660-l. This outgoing signal voltage corresponds to the signal applied by station 1-l to bi-directional line 640-l. Signal voltage $eo_1$ is then applied to common bus 664 wherefrom it is applied to gate electrode 669 of amplifier 667. As described with respect to amplifier 467, amplifier 667 provides a gain of 2. Control signal C is applied to IGFET switch 680-a to turn on the switch between times $t_1$ and $t_2$. In this manner, the output of amplifier 667 on drain electrode 668 is applied to storage capacitor 684-a.

At time $t_2$, control signals $A_{1-1}$, $\bar{A}_{1-1}$ and C are reversed and control signals $A_{1-n}$, $\bar{A}_{1-n}$ and D are activated as illustrated in waveforms 703, 705 and 711. Control signal $A_{1-n}$ renders IGFET switches 645-n and 650-n conductive and control signal $\bar{A}_{1-n}$ renders IGFET switches 620-n and 630-n non-conductive. During the time interval between times $t_2$ and $t_3$ storage capacitors 610-n and 625-n are connected series opposing and the output from these capacitors is applied to outgoing path 660-10 via IGFET switch 650-n. The signal voltage on outgoing line 660-n now corresponds to the outgoing voltage from station 1-n, $eo_n$.

Signal voltage $eo_n$ is then applied to gate electrode 669 of amplifier 667 via common bus 664. Since control signal D is now positive, IGFET switch 680-b is closed and the output of amplifier 667 is transferred from drain electrode 670 to capacitor 684-b and is stored in storage capacitor 684-b. At time $t_3$ control signals $A_{1-n}$, $\bar{A}_{1-n}$ and D are reversed and control signals $B_{1-n}$ and E are activated. Control signal $B_{1-n}$ closes IGFET switch 603-n and control signal E closes IGFET switch 691-a so that the signal voltage previously stored on capacitor 684-a is coupled therefrom through source follower 686-a, IGFET switch 691-a, common bus 662 and IGFET switch 603-n to series connected storage capacitors 608-n and 610-n and to gate electrode 614-n. Signal voltage corresponding to 2eol is coupled through source follower 612-n and matching impedance 618-n to bi-directional line 640-n and to storage capacitor 625-n. As a result of this transfer, signal voltage eol is tranferred to station 1-n and is also stored in capacitor 625-n by time $t_4$.

At time $t_4$, control signals $B_{1-n}$ and E are reversed to make IGFET switches 603-n and 691-a non-conductive and control signals $B_{1-l}$ and F are activated to render IGFET switches 603-l and 691-b conductive. Between times $t_4$ and $t_5$, the signal stored in storage capacitor 684-b is transferred to series connected storage capacitors 608-l and 610-l via source follower 686-b and conducting IGFET switches 691-b and 603-l whereby the signal voltage corresponding to 2eon derived from station 1-n is applied to capacitors 608-l and 610-l and to gate electrode 614-l of source follower 612-l. Signal voltage 2eon is coupled through source follower 612-l so that the signal voltage eon is applied to bi-directional line 640-l and to storage capacitor 625-l completing the signal exchange operation. At $t_5$, control signals $B_{1-l}$ and F are reversed, switches 691-b and 603-l are opened and the connection between the stations 1-l and 1-n is removed. During succeeding time slots, other selected station pairs are interconnected under control of control 697 whereby a pluarlity of signal exchanges occur over common buses 662 and 664.

It is to be understood that the foregoing arrangements are merely illustrative of the application of the principles of the invention. Numerous other arrangements may be devised by those skilled in the art without departing from the spirit and scope of the invention. For example, the balanced hybrid arrangement of FIG. 8 may be incorporated into the time division communication systems of FIGS. 4 and 6.

What is claimed is:

1. A hybrid circuit for transferring signals between the incoming and outgoing paths of a four-wire line and a two-wire line in a time division communication system comprising means connected to said incoming path in a first time interval including means for receiving a signal from said incoming path and first means for storing said received incoming path signal, means for applying said stored incoming path signal to said two-wire line, second means normally connected to said two-wire line for storing the sum of the incoming path signal applied to said two-wire line and the signal outgoing from said two-wire line, means operative in a second time interval including means for disconnecting said second storing means from said two-wire line, means for subtracting a portion of the stored incoming path signal in said first storing means from the signal in said second storing means, and means for applying the resultant difference signal corresponding to said two-wire line outgoing signal to said outgoing path.

2. A hybrid circuit according to claim 1 wherein said first storing means includes means for storing a portion of said received incoming path signal in said first time interval, and said stubtracting means comprises means for serially connecting said portion storing means, and said second storing means to said outgoing path applying means in said second time interval.

3. A hybrid circuit according to claim 1 wherein said first storing means comprises first and second serially connected storage capacitors, said second storing means comprises a third storage capacitor, and said subtracting means comprises means for connecting one terminal of said third storage capacitor to the junction of said first and second storage capacitors, and means for connecting the other terminal of said third storage capacitor to said outgoing path applying means.

4. A hybrid circuit according to claim 3 wherein said means for connecting said one third storage capacitor terminal to said junction comprises a first bidirectional semiconductor switch having one electrode connected to said junction and another electrode connected to said one terminal, and said means for connecting said other terminal of said third storage capacitor to said outgoing path comprises a second bidirectional semiconductor switch having a first electrode connected to said other terminal and a second electrode connected to said outgoing path applying means.

5. A hybrid circuit according to claim 4 wherein each of said first and second bidirectional semiconductor switches is an insulated gate field effect transistor,each having a gate electrode, a source and a drain, said source being said first electrode, said drain being said second electrode, siad gate electrode being connected to a control signal source.

6. A hybrid circuit for transferring signals between he incoming and outgoing paths of a four-wire line and a balanced two-wire line having first and second conductors comprising means connected to said incoming path in a first time interval including means for receiving a signal from said incoming path and first means for storing said incoming path signal, means for coupling said stored incoming path signal from said storing means to said two-wire line comprising means for applying a first signal corresponding to said stored incoming path signal to said first conductor, and means for applying a second signal corresponding to the inverted stored incoming path signal to said second conductor, second means normally connected to said two-wire line for storing the sum of said first signal, said second signal and the signal outgoing from said two-wire line, means operative in a second time interval including means for disconnecting said second storing means from said two-wire line and means for subtracting the stored incoming path signal in said first storing means from the sum of said first signal, said second signal and said outgoing signal in said second storing means, and means for applying the resultant difference signal corresponding to said two-wire line outgoing signal to said outgoing path.

7. In a time division communication system wherein a plurality of time slots occur in repetitive cycles and each time slot includes at least two distinct time intervals, a circuit for transferring signals between a bidirectional path and an incoming path and an outgoing path in a selected time slot comprising means selectively connectible to said incoming path for receiving a signal from said incoming path in one time interval of said selected time slot, first means connected to said receiving means for storing said received incoming path signal, means for applying said stored received incoming path signal to said bidirectional path, means normally connected to said bidirectional path including second means for storing the sum of the incoming signal applied to said bidirectional path and the outgoing signal from said bidirectional path, means operative in another time interval of said selected time slot including means for disconnecting said second storing means from said bidirectional path and means for subtracting a portion of said stored incoming path signal in said first storing means from the signal in said second storing means and for applying the resultant difference signal corresponding to said bidirectional path outgoing signal to said outgoing path.

8. In a time division communication system wherein a plurality of time slots occur in repetitive cycles and each time slot includes at least two distinct time intervals, a circuit according to claim 7 wherein said receiving means comprises first switching means connected between said incoming path and said first storing means, said first storing means comprises a pair of serially connected capacitors, said applying means comprises amplifying means connected between said first storing means and said bidirectional path, said subtracting means comprises second switching means for connecting one of said first storing means capacitors in series with said second storing means and third switching means for serially connecting said one of the first storing means capacitors and said second storing means to said outgoing path applying means.

9. In a time division communication system wherein a plurality of time slots occur in repetitive cycles and each time slot is divided into at least two distinct time intervals, a circuit according to claim 7 further comprising control means for controlling the order of occurrences of said time intervals so that said one time interval occurs prior to said other time interval.

10. In a time division communication system wherein a plurality of time slots occur in repetitive cycles and each time slot is divided into at least two distinct time intervals, a circuit according to claim 7 further comprising control means controlling the order of said time intervals so that said other time interval occurs prior to said one time interval.

11. A time division communication system wherein a plurality of time slots occur in repetitive cycles and each time slot includes at least a first distinct time interval comprising a plurality of stations; first and second common buses; a signal transfer network connected between said first and second common buses for transferring signals from said second bus to said first bus; means for generating first and second control signals in each time interval, each station having an associated coupling circuit connected to said station, said first common bus and said second common bus; each coupling circuit comprising means responsive to said first control signal for receiving signals from said first common bus, first means for storing said received signals, means for applying said stored received signals to said associated station, second storing means normally connected to said associated station for storing the sum of said applied stored received signals and signals outgoing from said associated station, and means responsive to said second control signal for disconnecting said second storing means from said associated station, means for subtracting a portion of the signal stored in said first storing means from the signal stored in said second storing means, and means for applying the resultant difference from said subtracting means to said second common bus; means operative in said first time interval of said distinct time slot comprising means for applying said first control signal to the first station coupling circuit and means for applying said second control signal to the second station coupling circuit whereby a signal is transferred from said first station to said second station in said distinct time slot.

12. A time division communication system according to claim 11 wherein each time slot further includes a second distinct time interval and further comprises means operative in said second time interval of said distinct time slot including means for applying the first control signal to said second station coupling circuit, and means for applying the second control signal to said first station coupling circuit.

13. A time division communication system according to claim 11 wherein said first storing means comprises first and second serially connected storage capacitors, said second storing means comprises a third storage capacitor and said subtracting means comprises means for serially connecting said second storage capacitor and said third storage capacitor to said resultant difference applying means.

14. A time division communication system according to claim 13 wherein said receiving means comprises first switching means responsive to said first control signal applied to said coupling circuit for connecting said first common bus to said first storing means, said disconnecting means comprises second switching means responsive to said second control signal for disconnecting said third storage capacitor from said station, and said serially connecting means comprises third switching meanS responsive to said second control signal for connecting said second storage capacitor to one terminal of said third storage capacitor and for connecting the other terminal of said third storage capacitor to said resultant difference applying means

15. A time division communication system according to claim 14 wherein each of said switching means comprises an IGFET having gate, source and drain electrodes, said first switching means comprising an IGFET having its source electrode connected to said first common bus, its drain electrode connected to said first storing means and its gate electrode connected to said first control signal applying means, said second switching means comprising one IGFET having its source electrode connected to one station conductor, its drain electrode connected to said one terminal of said third storage capacitor and its gate electrode connected to said second control signal applying means and another IGFET having its source electrode connected to the other terminal of said third storage capacitor, its drain electrode connected to the other station conductor and its gate electrode connected to said second control signal applying means and said third switching means comprises one IGFET having its source electrode connected to one terminal of said second storage capacitor, its drain electrode connected to said one terminal of said third storage capacitor and its gate electrode connected to said second signal applying means, and another IGFET having its source electrode connected to the other terminal of said third storage capacitor, its drain electrode connected to said outgoing path, and its gate electrode connected to said second control signal applying means.

16. A time division communication system wherein a plurality of time slots occur in repetitive cycles and each time slot includes at least first and second time intervals comprising a plurality of stations; first and second common buses; control means for generating first and second control signals in each time interval; each station having an associated coupling circuit connected to said station, said first common bus and said second common bus; each coupling circuit comprising means responsive to said first control signal for receiving a signal from said first common bus, first means for storing said received, signal, means for applying said stored received signal to said associated station, second means normally connected to said associated station for storing the sum of the coupled received signal and the signal outgoing from said associated station, means responsive to said second control signal for disconnecting said second storing means from said associated station, means for subtracting a portion of the signal in said first storing means from the signal in said second storing means, and means for coupling the resultant difference signal corresponding to the outgoing signal from said station to said second common bus; means operative in said first time interval comprising means for applying said second control signal to a first station coupling circuit, and third means connected to said second common bus for storing the outgoing signal from said first station coupling circuit, means operative in said second time interval comprising means for applying said first control signal to a second station coupling circuit, and means for applying said first station outgoing signal in said third storing means to said first common bus.

17. A time division communication system according to claim 16 wherein each time slot further includes third and fourth time intervals further comprising means operative in said third time interval comprising means for applying said second control signal to the second station coupling circuit and fourth means connected to said second common bus for storing the outgoing signal from said second station coupling circuit; and means operative in said fourth time interval comprising means for applying said first control signal to said first station coupling circuit, and means for applying said second station outgoing signal in said fourth storing means to said first common bus.

18. A time division communication system wherein a plurality of time slots occur in repetitive cycles and each time slot includes first and second time intervals comprising a plurality of stations; first and second common buses, control means for generating first and second control signals in a distinct time slot, each station having an associated coupling circuit connected to said station, said first common bus and said second common bus; each coupling circuit comprising means responsive to a first control signal for receiving a signal from said first common bus, first means for storing said received signal, means for applying said stored received signal to said associated station, second means normally connected to said associated station for storing the sum of the applied received signal and the signal outgoing from said associated station, means responsive to a second control signal for disconnecting said second storing means from said associated station, means responsive to said second control signal for subtracting a portion of the signal in said first storing means from the signal in said second storing means and means for coupling the resultant difference signal corresponding to the outgoing signal from said station to said second common bus; means for transferring signals from a first station to a second station in said distinct time slot comprising apparatus operative in said first time interval comprising means for applying said second control signal to said first station coupling circuit disconnecting means and subtracting means, and third means connected to said second common bus for storing the outgoing signal from said first station subtracting means; means operative in a second time interval of said distinct time slot comprising means for applying said first control signal to said second station coupling circuit receiving means, and means for applying the stored outgoing first station signal in said third storing means to said first common bus.

19. A time division communication system wherein a plurality of time slots occur in repetitive cycles and each time slot includes first, second, third and fourth time intervals comprising a plurality of stations; first common bus and second common bus; control means for generating first and second control signals, each station having an associated coupling circuit connected to said station, said first common bus and said second common bus; each coupling circuit comprising means responsive to a first control signal for receiving a signal from said first common bus, first means for storing said received signal, means for applying said stored received signal to said associated station, second means normally connected to said associated station for storing the sum of said coupled received signal and the signal outgoing from said associated station, means responsive to a second control signal for disconnecting said second storing means from said associated station, means responsive to said second control signal for subtracting a portion of the signal in said first storing means from the signal in said second storing means and means for coupling the resultant difference signal corresponding to the outgoing signal from said station to said second common bus; means for exchanging signals between a first station and a second station in a distinct time slot comprising means operative in said first time interval comprising means for applying said second control signal to said first station coupling circuit subtracting means and said first station coupling circuit disconnecting means; and third means connected to said second common bus for storing the outgoing signal from said first station subtracting means; means operative in said second time interval of said distinct time slot comprising means for applying said second control signal to the second station coupling circuit subtracting means and the second station coupling circuit disconnecting means, and fourth means connected to said second common bus for storing the outgoing signal from said second station coupling circuit subtracting means; means operative in said third time interval of said distinct time slot comprising means for applying said first control signal to said second station coupling circuit receiving means and means for applying the stored outgoing first station signal in said third storing means to said first common bus; and means operative in the fourth time interval of said distinct time slot comprising means for applying said first control signal to said first station coupling circuit receiving means, and means for applying the stored second station outgoing signal in said fourth storing means to said first common bus.

* * * * *